Feb. 13, 1951  F. G. BROCKMAN ET AL  2,541,743
PARTICLE FORM SOLID LEVEL INDICATOR
Filed April 3, 1946  2 Sheets-Sheet 1
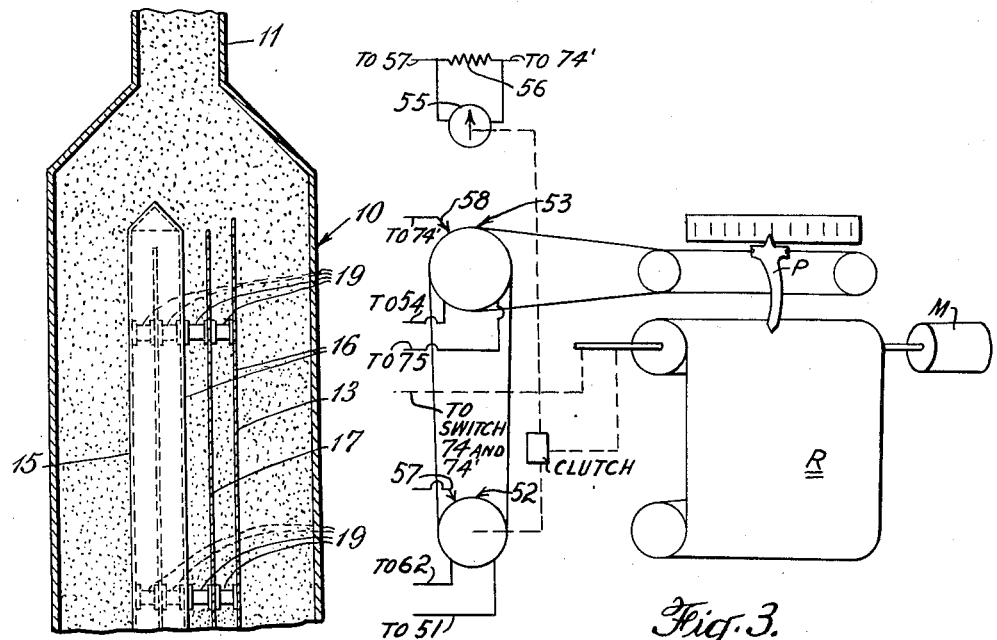
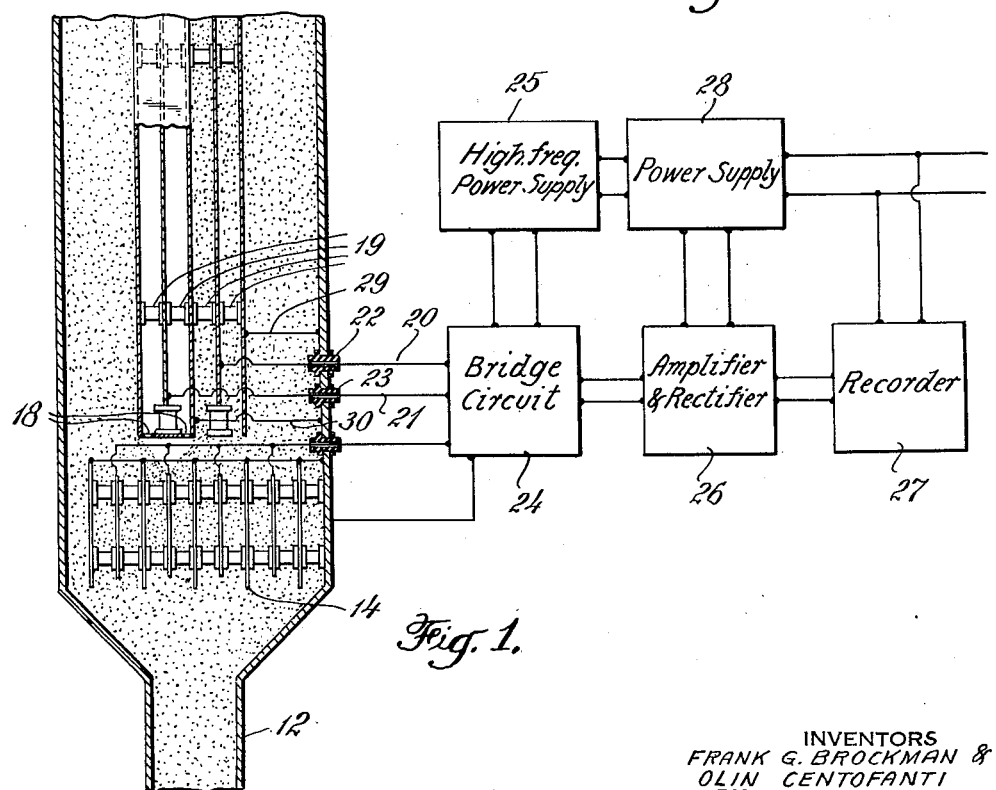
INVENTORS
FRANK G. BROCKMAN &
OLIN CENTOFANTI
BY
James Y. Cleveland
ATTORNEY

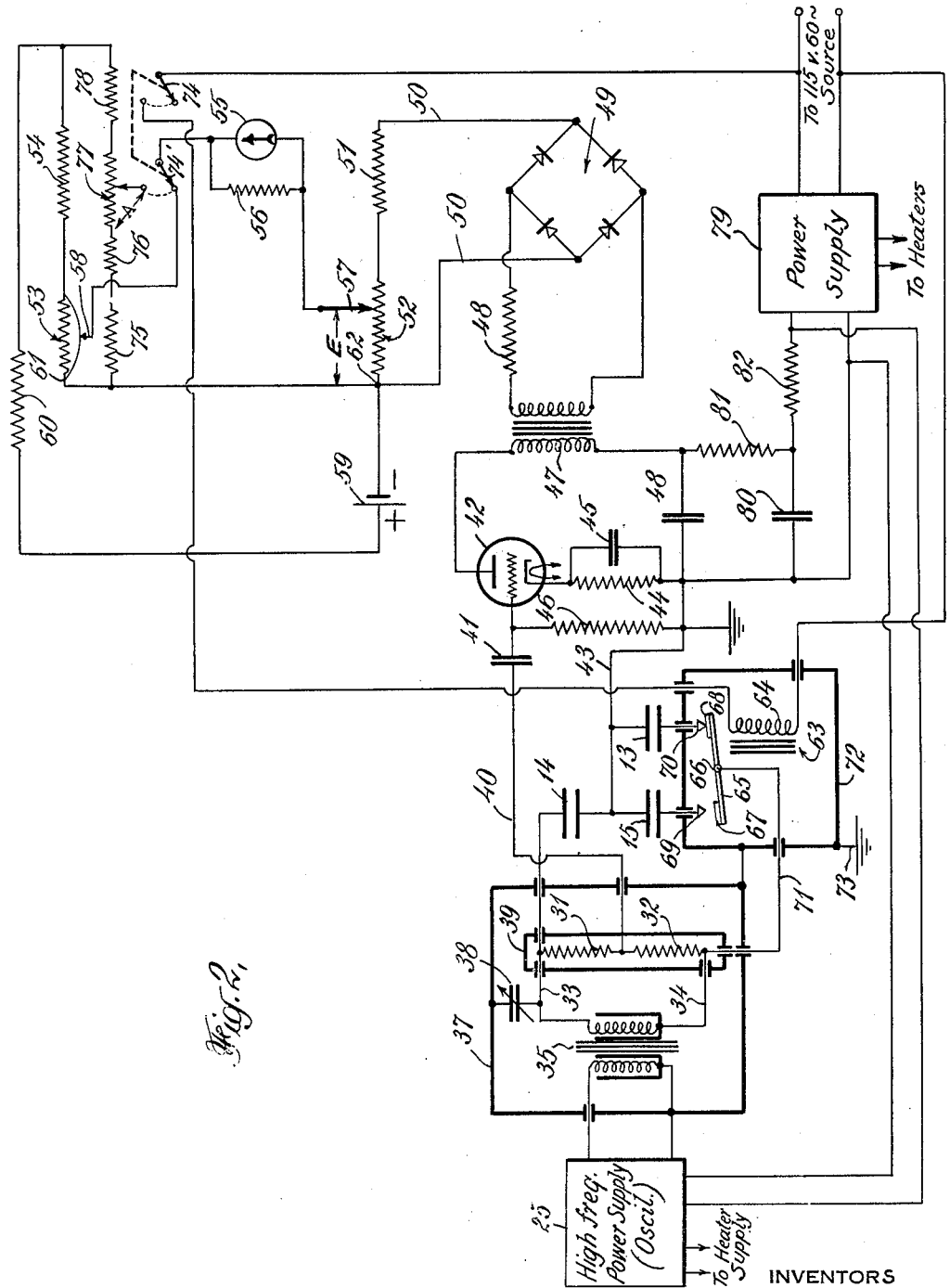

Patented Feb. 13, 1951

2,541,743

UNITED STATES PATENT OFFICE 2,541,743

PARTICLE FORM SOLID LEVEL INDICATOR

Frank G. Brockman, Dobbs Ferry, N. Y., and Olin Centofanti, Paulsboro, N. J., assignors to Socony-Vacuum Oil Company, Incorporated, New York, N. Y., a corporation of New York Application April 3, 1946, Serial No. 659,400

7 Claims. (Cl. 73—304)

This invention relates generally to level indicators and more particularly to an apparatus for indicating the level of particle-form solid substances such as catalysts in the reactor hoppers of continuous catalytic cracking units.

In the operation of continuous catalytic cracking units, a knowledge of the level of the catalyst in the regenerator and the reactor hoppers is required. In the prior art, mechanical devices have been relied upon for the indication of these levels. Such devices have not met with any appreciable degree of success. In commercial units the pressures within the hoppers will differ from atmospheric pressure. Mechanical devices, at least of the designs so far suggested, require a pressure seal around the moving mechanical element at the point at which it leaves the hopper. This seal will be subject to a maximum temperature of 800° F. If the mechanical device is enclosed inside the hopper, the moving parts are constantly exposed to the danger of severe abrasion due to the moving catalyst.

Therefore, the problem confronting the refiners was to design a level indicator having no moving parts, that is capable of withstanding catalyst temperatures as high as 800° F., that will allow the hopper in which it is disposed to be sealed off so that pressures different from atmospheric may be attained therein, and that will give an indication and/or recording at some point remote from the hopper. Additionally, in contrast to systems heertofore known which are limited by pendulum action which occurs with total absence of catalyst at the measuring element, the level indicator must have a range suitable for any requirement.

It is the primary object of this invention to provide such a level indicator and/or recorder.

This is accomplished by inserting in a vertical position in the hopper a pair of electrically insulated plates with the flat sides parallel and spaced as closely as is consistent with the ready flow of catalyst between the plates. These plates and the space between them form an electrical condenser, and as catalyst level rises and falls between the plates the electrical capacitance changes from a minimum capacitance in air (the empty condition) to a maximum capacitance (the condition when the space is filled with catalyst). The magnitude of this capacitance change is determined by the ratio between the dielectric constant of ambient air and the apparent dielectric constant of the catalyst. "Apparent" dielectric constant refers to the fact that catalyst flowing into a space does not completely displace the air. As a result, the apparent dielectric constant is less than the true dielectric constant.

In addition to the condenser just described, two other condensers are used. One substantially identical with the measuring condenser, is permanently closed off from the catalyst so that it cannot enter the space between the plates and serves as "zero reference." The other is placed at the bottom of the assembly and is designed to have substantially the same capacitance when empty as the zero reference condenser. This condenser, being near the bottom of the hopper, is always filled with the catalyst in the system and serves as a "fixed capacity."

This triple condenser arrangement has two important advantages over the use of a single condenser. First, all are as nearly identical from a capacity point of view as possible, therefore the leakage resistances of all three are approximately equal; and second, the apparent dielectric constant of the catalyst may vary, depending upon the type of catalyst employed and upon the fineness of subdivision of any one type, and yet perfect calibration of the system can be maintained by reference to the condenser that is maintained full of the catalyst. The inclusion of the full reference condenser eliminates errors in calibration due to any change in dielectric constant of the catalyst.

The measuring condenser and the full reference condenser are connected in a bridge circuit which is balanced when the measuring condenser is full and the unbalancing of this circuit by the catalyst flowing through the measuring condenser is a measure of the level of the catalyst in the hopper. The zero reference condenser is periodically and automatically switched into the bridge circuit in the place of the measuring condenser to automatically correct the full scale calibration of the indicator.

A more complete understanding of the present invention may be had from the following detailed description when considered with the drawings, in which Figure 1 is a diagrammatic vertical sectional view of a catalyst hopper showing an application of the present invention, Figure 2 is an electrical wiring diagram illustrating the operation of this invention, and Figure 3 is a schematic illustration of a recorder such as that manufactured by Leads and Northrup Company, Philadelphia, Pa.

Referring to the drawings in detail, particularly Figure 1, a catalyst hopper 10, for a fractional distillation column, is shown in vertical section. The hopper is provided at its top with an inlet passageway 11 for admitting catalyst and an outlet passageway 12 at its bottom through which the catalyst is discharged to the fractionating column, not shown.

Disposed within the hopper 10 are condensers 13, 14 and 15. These condensers, with the electrical equipment indicated diagrammatically, serve to accurately indicate and/or record the level of the catalyst in the hopper 10.

Condenser 13, comprising the stationary plates 16 and 17, changes in capacitance as the clay level rises and falls between the plates from a minimum capacity when empty to a maximum capacity when the space between the plates is filled. The clay serves as a dielectric for the condenser.

In order to indicate or record the variation of the capacity of condenser 13, as a measure of the catalyst level in the hopper 10, it is connected in a Wheatstone bridge circuit with the condenser 14 which is maintained full of catalyst which serves as its dielectric. Condenser 14 must be constructed to have the same capacity when empty as condenser 13. At least, the capacitances of the two condensers, when full, should be so nearly the same that the bridge in which they are connected can be readily balanced electrically. Condenser 15 also has the same capacity as 13 and 14 when empty and is completely enclosed except for an air vent 18 at the bottom thereof. Therefore, its capacity will remain constant except for changes in the dielectric properties of the ambient air which will produce a substantially equal effect on all three condensers.

Condensers 13 and 15 may each have three, five or more plates if desired. For purpose of illustration they have been shown in the drawings as having three plates each. The plates are suitably supported in the hopper by means not shown and held in spaced relationship by insulators 19. An odd number of plates for each condenser is to be preferred since, by using an odd number, stray capacitances to ground, which would exist with an even number of plates, can be minimized.

The reduction in stray capacitances is produced in the three-plate case by connecting the two outside plates together and forming the capacity between the central plate and the outside ones. In a five-plate case, the first, third and fifth plates would be joined and form one terminal of the condenser, while the other terminal of the capacity is formed by connecting the second and four plates together. The actual reduction in stray capacities results from a choice of measuring circuits which permits the outside plates of all three condensers to be connected together and to ground. In Figure 1, one outside plate of each of the condensers 13 and 15 is common.

The central plates of condensers 13 and 15 have conductors 20 and 21 connected to them. These conductors extend through insulating bushings 22 and 23, shown in the drawings as located in one side of the hopper near its bottom, to a bridge circuit 24. The common plate between the two condensers 13 and 15 and the outer plates of each of these condensers are connected to a common ground which may be the housing 10 by the conductors 29 and 30. Bridge circuit 24 is supplied with power from a high frequency power source 25, for example, at 5000 cycles per second frequency. The output voltage of the bridge circuit resulting from any unbalance due to the catalyst level is amplified and rectified by the amplifier and rectifier 26 and then indicated and/or recorded at 27. Direct current power is supplied to the high frequency power source and amplifier by the power supply 28 which may be a full wave rectifier fed by conventional 60 cycle frequency alternating current.

Condenser 14 is located in the bottom portion of the housing 10 and is constructed to have the same electrical characteristics as condensers 13 and 15. This condenser, which is at all times filled with the clay catalyst, will be discussed in detail later in the following description.

Referring to Figure 2 of the drawings, a Wheatstone bridge circuit comprising the resistances 31 and 32 and the condensers 13 and 14 is supplied with power through the medium of conductors 33 and 34 from the secondary winding of transformer 35. Power is supplied to the primary winding of the transformer 35 from a high frequency power supply source 25, such as an oscillator. The transformer 35 and the resistance elements 31 and 32, as well as their connecting conductors, are enclosed within a shield 37. Shield 37 is in turn connected directly to the ground side of the primary circuit of the transformer 35 and through a variable condenser 38 to the secondary circuit of the transformer 35. Condenser 38 is included in parallel with condenser 14 to balance out the capacitance existing between the shield connected to 34 and ground. In addition to the shield 37 there is provided a separate shield 39 for the resistance elements 31 and 32. Shield 39 is connected to the junction of the resistances 31 and 32. This junction is in turn connected through a conductor 40 and a condenser 41 to the grid of a amplifier tube 42, such as a type 6J5GT. In order to complete the input circuit to the amplifier tube 42 the junction of condensers 13 and 14 is connected through a conductor 43 to ground which is also the grid return for tube 42. The output voltage of the bridge circuit due to an unbalanced condition of the bridge resulting from any lowering of the catalyst level from full in condenser 13 will be impressed across the grid resistor 46 and the potential developed thereby impressed upon the amplifier tube 42. The plate current from the amplifier tube 42 flows through the primary of a transformer 47 and back to the cathode through the condenser 48 and the self-biasing resistor 44 and its by-pass condenser 45. The flow of current through the primary of the transformer 47 induces a voltage in the secondary winding of the transformer which causes a current to flow through the resistance 48 and rectifier bridge circuit 49. The rectified current is taken from the rectifier bridge circuit 49 by means of the conductors 50 and is impressed across the resistances 51 and 52 of the recorder circuit. Resistance 52 is a potentiometer in the form of a slide wire that can be regulated through a clutch by the pen motor of the recorder in a manner well known in the art. Potentiometer 52 is connected directly across the output of the rectifier 49. It is automatically adjusted so that the voltage at its output terminals marked "E" will be equal to the full scale voltage of the recorder when condenser 15 is automatically switched into the Wheatstone bridge circuit. The resistance 51 is provided to limit the current in resistance 52 to a suitable value.

Resistances 75, 76, 77 and 78 and resistances 53 and 54 form two separate potentiometer circuits. The galvanometer 55 of the recorder having a shunt resistance 56 is connected into the recorder potentiometer circuit by means of the slide wire contacts 57 and 58. This potentiometer circuit is supplied with power from a 1½ volt dry cell 59 through a resistance 60. The galvanometer 55, on actuation, adjusts the slide wire 58 to make the voltage developed between the slide wire contact 58 and the terminal 61 of resistance 53 equal to the voltage drop developed in that portion of the resistance 52 between the slide wire contact 57 and the end 62 of the resistance 52. Any change in the IR drop developed in the resistance 52 will cause a corresponding deflection of the galvanometer 55, which in turn will vary the slide wire contact 58 to bring about a new adjustment of the potentiometer. Since the pen is driven by the same shaft that drives the slide wire the record will vary directly in accordance with the change in voltage drop produced across the resistance 52.

The recorder and its relationship to certain of the elements shown in the circuit diagram of Figure 2 are shown in Figure 3. The motor M operates continuously when the recorder is in operation. Motor M in addition to driving the recorder strip R operates the switches 74 and 74' and the clutch at intervals to standardize the circuit by switching the condensers as described above. The slidewire 53 operates the pen P and potentiometer 52 when it is set in operation by the moving element of the galvanometer 55.

The circuit described thus far is for the purpose of comparing the variable capacity of condenser 13 with the capacity of the full condenser 14 as a standard. In order to make a more accurate record of the variation of catalyst level in the hopper the empty or full scale reading of the recorder is periodically checked against the capacity of the condenser 14 which is at all times completely full of the catalyst. This is accomplished as follows and initiates a standardizing cycle. A switching arrangement is provided for the purpose of switching the empty condenser 15 into the bridge circuit in place of the measuring condenser 13. This will produce a maximum unbalance condition of the bridge, varying in magnitude with changes in the catalyst characteristics. This switching arrangement comprises a relay 63 that is provided with a winding 64 and an armature 65. Armature 65 is pivoted at 66 and carries contactors 67 and 68 at opposite ends thereof. Contactors 69 and 70 are respectively connected to the condensers 15 and 13 and are adapted for respective engagement with contactors 67 and 68 carried by the armature 65 of the relay 63. The midpoint of the armature 65 is connected by a conductor 71 to the juncture of resistance 32 and the conductor 34 to complete the bridge circuit. The relay 63 and the contacts 69 and 70 are all enclosed in a shield 72 which is grounded at 73. Relay 63 is actuated automatically by the recorder through the medium of the switch 74 which in turn is actuated at predetermined intervals to energize the relay to disengage the contacts 68 and 70 and engage the contacts 67 and 69 to thereby switch the condenser 15 into the bridge circuit in place of the condenser 13. Switch 74 is ganged for operation with a second switch 74'. Therefore, when switch 74 is actuated by the recorder, switch 74' is in turn operated to switch the recorder into a fixed potentiometer circuit that has been preset.

This starts the standardizing cycle. When this condition exists, the resistances 75, 76, 77 and 52 together with galvanometer 55 form a potentiometer circuit that will balance the voltage across 75, 76 and "A" of 77, which is equal to the voltage across 53, against the voltage appearing at "E." Any difference existing between these voltages will deflect the galvanometer and cause the recorder mechanism to move the sliding contact 57 along resistance 52, through a clutch, which is engaged only during the standardizing cycle, until the voltages are equal. The voltage across 53 being equal to that across 75, 76 and A of 77 will now also be equal to that at "E," which will be a result of the maximum unbalancing of the bridge establishing the empty or full scale calibration of the recorder.

When the switches 74, 74' go back to the measuring position and relay 63 places the measuring condenser 13 back in the bridge circuit in place of condenser 15; the voltage appearing at "E" will be equal to that across 53, if the condenser 13 is empty. Then the contact 58 will be driven to the maximum voltage position, i. e. toward resistance 54. The recording pen being mechanically connected to contact 58, will therefore record and/or indicate the empty condition. Any increase in level above the empty condition of condenser 13 would begin to balance the bridge and reduce the voltage at "E," allowing the recorder driving mechanism, actuated through galvanometer 55, to begin to drive the contact 58 and pen towards the zero voltage position 61, following the level rise in condenser 13 by continually balancing the voltage at E against the voltage between 61 and 58. This action continues through the measuring cycle, until the recorder switches into the standardizing cycle. As has been pointed out previously, the effect of changes in catalyst dielectric properties during the measuring cycle are partially compensated for automatically because the effects are felt by the two bridge arms formed by condensers 13 and 14 at the same time, until condenser 13 approaches the full condition at which time full automatic compensation occurs.

The entire apparatus is operated from a conventional 115 volt-60 cycle power source. A power supply 79 furnishes the heater and plate supply potentials for the amplifier and high frequency power supply 25. The condensers 48 and 80 with the resistances 81 and 82 form a filter for the amplifier plate supply potential.

Although this invention has been illustrated and described in detail as applied to the measurement of the clay level in a catalytic cracking unit it is obvious that it has broader application and can be used to measure the level of any bulk material that will serve as a dielectric for the condensers.

We claim:

1. A particle-form solid level indicator comprising in combination a first energy storage means, said energy storage means having at least two spaced plates that are in length at least as great as the range of variations in level that it is desired to indicate, means for supporting the plates in vertical position in the particle-form solid whose level is to be indicated so that the particle-form solid will fill the space between the plates to the level of the particle-form solid whose level is to be indicated and serve as a dielectric between them, the region between said plates being accessible to said particle-form solid substantially throughout the length of said plates, a bridge circuit having said energy storage means as an arm thereof, a second energy storage means having electrical and physical characteristics substantially equal to said first energy storage means, means for connecting said second energy storage means into the bridge circuit as a second arm thereof, means for mounting said second energy storage means in a position such that it is at all times maintained full of the particle-form solid, means for supplying power to said bridge, means for measuring the degree of unbalance of said bridge as effected by the variation of the level of the particle-form solid.

2. A particle-form solid level indicator comprising in combination a first condenser, said condenser having at least two spaced plates, the region between said spaced plates being accessible to the particle-form solid whose level is to be indicated substantially throughout the length of said plates, means for supporting the plates in vertical position in the particle-form solid whose level is to be indicated so that the particle-form solid will fill the space between the plates to the level of the particle-form solid and serve as a dielectric between them, a bridge circuit having said condenser as an arm thereof, a second condenser having electrical characteristics substantially equal to said first condenser, means for connecting said second condenser into the bridge circuit as a second arm thereof, means for mounting said second condenser in a position such that it is at all times maintained full of the particle-form solid, means for supplying an alternating potential to said bridge, means for measuring the degree of unbalance of said bridge as effected by the variation of the level of the particle-form solid.

3. A level indicator for particle-form solid material that comprises in combination, an electrical condenser having spaced electrodes that are of a length at least as great as the range of variation of the level to be indicated, means for mounting the condenser in the particle-form solid material in a position such that the particle-form solid material can enter the region between the electrodes at all points throughout the substantial length of the electrodes to fill the space between the electrodes to the level of the particle-form solid material, a resistance-capacity Wheatstone bridge, means for connecting the condenser as an arm of said bridge, a second electrical condenser having electrical characteristics similar to the first condenser, means for mounting said second electrical condenser in the particle-form solid material in a position such that the space between its electrodes will at all times be maintained full of the particle-form solid material, means for connecting said second condenser as a second arm of the bridge circuit, a source of power for the bridge circuit, means connected across said bridge circuit to amplify the current flowing in the bridge circuit when the bridge is unbalanced, means for recording the amplified current as an indication of the level of the particle-form solid material.

4. A level indicator for particle-form solid materials comprising in combination, a pair of spaced electrodes forming an electrical condenser that are of a length at least as great as the range of variation of the level to be indicated, means for mounting the condenser in the particle-form solid material in such a manner that the particle-form solid material can enter the region between the electrodes at all points throughout the substantial length of the electrodes to enter the space between the electrodes and function in part as the dielectric for the condenser, the level of the particle-form solid material between the electrodes varying in accordance with the level to be indicated of the particle-form solid material and proportionally varying the capacity of said condenser, a capacity-resistance bridge, means for connecting said condenser as one arm of said bridge, a second electrical condenser having substantially equal electrical and physical characteristics to said first electrical condenser, means for mounting said second condenser in the particle-form solid material in such a manner that it will at all times have the space between its electrodes entirely filled with said particle-form solid material, means for connecting the second condenser as a second arm of the resistance-capacity bridge, means for supplying high frequency power to said bridge, means for amplifying the current flowing in said bridge due to any unbalanced condition, means for rectifying the amplified current and means for recording the rectified current as an indication of the level of the particle-form solid material.

5. A level indicator for bulk material comprising in combination, a pair of spaced electrodes forming an electrical condenser, means for mounting the condenser in the bulk material in such a manner that the bulk material will enter the space between the electrodes and function in part as the dielectric for the condenser, the level of the bulk material between the electrodes varying in accordance with the level to be indicated of the bulk material and proportionally varying the capacity of said condenser, a capacity-resistance bridge, means for connecting said condenser as one arm of said bridge, a second electrical condenser having substantially equal electrical and physical characteristics to said first electrical condenser, means for mounting said second condenser in the bulk material in such a manner that it will at all times have the space between its dielectric entirely filled with said bulk material, means for connecting the second condenser as a second arm of the resistance-capacity bridge, means for supplying high frequency power to said bridge, means for amplifying the current flowing in said bridge due to any unbalanced condition, means for rectifying the amplified current, means for recording the rectified current as an indication of the level of the bulk material, a third condenser having electrical and physical characteristics substantially equal to said first and second condensers, means for mounting the third condenser adjacent said first condenser, means for enclosing said third condenser to maintain the space between the electrodes thereof free of the bulk material, means for replacing said first condenser in the bridge circuit by the third condenser at predetermined time intervals, means driven by the recorder for determining the time intervals, additional means driven by the recorder for adjusting the range of the recorder while the third condenser is connected in the bridge circuit whereby the effect of variation of the dielectric properties of the bulk material is compensated.

6. A level indicator for bulk materials that comprises in combination, a first energy storage means, said energy storage means having at least two spaced elements, means for supporting said elements in a vertical position in the bulk material whose level is to be indicated in a manner that the bulk material will fill the space between the elements up to the level of the bulk material and will serve as a dielectric for the energy storage means, a bridge circuit, means for connecting said energy storage means as an arm of the bridge circuit, a second energy storage means having electrical and physical characteristics substantially equal to said first energy storage means, means for mounting said second energy storage means in the bulk material in the vicinity of said first energy storage means but in such a manner that it will at all times have the space between its elements maintained full of the bulk material, a third energy storage means having electrical and physical characteristics substantially equal to those of said first and second energy storage means, means for mounting said third energy storage means in the vicinity of said first energy storage means in a manner that it will at all time have the space between its elements free of the bulk material but the elements thereof will be subjected to the same ambient conditions as the first energy storage means, means for connecting the third energy storage means into the bridge circuit, a recorder, means for connecting the recorder to the bridge circuit to record the condition of balance of said bridge, means for replacing said first energy storage means in the bridge circuit with the third energy storage means at predetermined time intervals, whereby the range of the recorder is calibrated at predetermined time intervals.

7. A level indicator for bulk materials that comprises in combination, a first energy storage means, said energy storage means having at least two spaced elements, means for supporting said elements in a vertical position in the bulk material whose level is to be indicated in a manner that the bulk material will fill the space between the elements up to the level of the bulk material and will serve as a dielectric for the energy storage means, a bridge circuit means for connecting said energy storage means as an arm of the bridge circuit, a second energy storage means having electrical and physical characteristics substantially equal to those of said first energy storage means, means for mounting said second energy storage means in the bulk material in the vicinity of said first energy storage means but in such a manner that it will at all times have the space between its elements maintained full of the bulk material, a third energy storage means having electrical and physical characteristics substantially equal to those of said first and second energy storage means, means for mounting said third energy storage means in the vicinity of said first energy storage means in a manner that it will at all times have the space between its elements free of the bulk material but the elements thereof will be subjected to the same ambient conditions as the first energy storage means, means for connecting the third energy storage means into the bridge circuit, a recorder, means for connecting the recorder to the bridge circuit to record the condition of balance of said bridge, means for replacing said first energy storage means in the bridge circuit with the third energy storage means at predetermined time intervals, and means responsive to the degree of balance of said bridge for adjusting the full scale range of the recorder whereby the range of the recorder is calibrated at predetermined time intervals.

FRANK G. BROCKMAN.
OLIN CENTOFANTI.

REFERENCES CITED

The following references are of record in the file of this patent:

UNITED STATES PATENTS

| Number | Name | Date |
| --- | --- | --- |
| 2,188,628 | Freystedt | Jan. 30, 1940 |
| 2,354,964 | Ostermann et al. | Aug. 1, 1944 |
| 2,357,023 | Reid et al. | Aug. 29, 1944 |
| 2,375,084 | Coroniti et al. | May 1, 1945 |

FOREIGN PATENTS

| Number | Country | Date |
| --- | --- | --- |
| 114,980 | Sweden | July 19, 1945 |